United States Patent [19]

Alexandrovich et al.

[11] Patent Number: 4,837,393

[45] Date of Patent: Jun. 6, 1989

[54] ELECTROSTATOGRAPHIC TONER PARTICLE COMPRISING A POLYESTER CONTAINING A COVALENTLY BOUND QUATERNARY PHOSPHONIUM SALT

[75] Inventors: Peter S. Alexandrovich; Lawrence P. DeMejo; John C. Wilson, all of Rochester, N.Y.

[73] Assignee: Eastman Kodak Company, Rochester, N.Y.

[21] Appl. No.: 229,045

[22] Filed: Aug. 5, 1988

[51] Int. Cl.$^4$ .......................... G03G 9/08; G03G 9/10; G03G 9/14

[52] U.S. Cl. ..................................... 430/110; 430/111; 430/503; 430/904

[58] Field of Search ................ 430/903, 904, 110, 111

[56] References Cited

U.S. PATENT DOCUMENTS

| | | |
|---|---|---|
| 3,985,664 | 10/1976 | Sakaguchi et al. ................. 430/904 |
| 4,020,192 | 4/1977 | Nozaki ................................. 430/111 |
| 4,224,396 | 9/1980 | Pollet . | 
| 4,299,898 | 11/1981 | Williams et al. . |
| 4,496,643 | 1/1985 | Wilson et al. . |
| 4,525,446 | 6/1985 | Uytterhoeven et al. . |
| 4,537,848 | 7/1985 | Yourd et al. . |
| 4,547,449 | 10/1985 | Alexandrovich et al. . |
| 4,606,989 | 8/1986 | Uytterhoeven et al. . |
| 4,639,403 | 1/1987 | Podszün et al. . |
| 4,729,925 | 3/1988 | Chen et al. ............................ 430/31 |

*Primary Examiner*—Roland E. Martin
*Assistant Examiner*—Jeffrey A. Lindeman
*Attorney, Agent, or Firm*—David F. Janci

[57] ABSTRACT

New electrostatographic toners and developers are provided, containing dual function polyester binder/-charge agents. The new toner particle has an average diameter in the range of 0.01 to 100 micrometers and comprises a binder polyester and a charge-control agent comprising a quaternary phosphonium salt, wherein the phosphonium salt has an anionic portion comprising a sulfonate group covalently bonded to a moiety containing at least one ester linkage to the binder polyester.

6 Claims, No Drawings

ELECTROSTATOGRAPHIC TONER PARTICLE COMPRISING A POLYESTER CONTAINING A COVALENTLY BOUND QUATERNARY PHOSPHONIUM SALT

FIELD OF THE INVENTION

This invention relates to electrostatographic toner particles comprising polyester binders. More particularly, the invention concerns new toner particles comprising polyesters containing certain quaternary phosphonium salts, wherein the anionic portions of the salts are covalently bonded to the polyesters through ester linkages. The polyesters serve as dual function binder/charge agents in the inventive electrostatographic toner particles.

BACKGROUND

In electrostatography an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with an electrostatographic developer. If desired, the latent image can be transferred to another surface before development.

One well-known type of electrostatographic developer comprises a dry mixture of toner particles and carrier particles. Developers of this type are commonly employed in well-known electrostatographic development processes such as cascade development and magnetic brush development. The particles in such developers are formulated such that the toner particles and carrier particles occupy different positions in the triboelectric continuum, so that when they contact each other during mixing to form the developer, they become triboelectrically charged, with the toner particles acquiring a charge of one polarity and the carrier particles acquiring a charge of the opposite polarity. These opposite charges attract each other such that the toner particles cling to the surfaces of the carrier particles. When the developer is brought into contact with the latent electrostatic image, the electrostatic forces of the latent image (sometimes in combination with an additional applied field) attract the toner particles, and the toner particles are pulled away from the carrier particles and become electrostatically attached imagewise to the latent image-bearing surface. The resultant toner image can then be fixed in place on the surface by application of heat or other known methods (depending upon the nature of the surface and of the toner image) or can be transferred to another surface, to which it then can be similarly fixed.

A number of requirements are implicit in such development schemes. Namely, the electrostatic attraction between the toner and carrier particles must be strong enough to keep the toner particles held to the surfaces of the carrier particles while the developer is being transported to and brought into contact with the latent image, but when that contact occurs, the electrostatic attraction between the toner particles and the latent image must be even stronger, so that the toner particles are thereby pulled away from the carrier particles and deposited on the latent image-bearing surface. In order to meet these requirements for proper development, the level of electrostatic charge on the toner particles should be maintained within an adequate range.

Many well-known types of toner particles useful in dry developers comprise polyester binder materials, chosen for their good combinations of advantageous properties, such as toughness, transparency, good adhesion to substrates, and fusing characteristics, such as the ability to be fixed to paper at relatively low fusing temperatures while not permanently adhering to fusing rolls, except at relatively high temperatures. As used herein, the term, "polyester", is intended to mean a polymer in which backbone recurring units are connected by ester linkages. As is well known, polyesters useful as binder materials in toner particles can be linear, branched, or lightly crosslinked and can be fashioned from any of many different monomers, typically by polycondensation of monomers containing two or more carboxylic acid groups (or derivatives thereof, such as anhydride or ester groups) with monomers containing two or more hydroxyl groups.

Also, toner particles in dry developers often contain material referred to as a charge agent or charge-control agent, which helps to establish and maintain toner charge within an acceptable range. Many types of charge-control agents have been used and are described in the published patent literature.

One general type of charge-control agent known to be useful in polyester toner particles for dry developers comprises a quaternary phosphonium salt. A number of such quaternary phosphonium salt charge-control agents are described, for example, in U.S. Pat. Nos. 4,496,643 and 4,537,848. Unfortunately, many of those known charge-control agents can exhibit a number of drawbacks in some developers.

For example, some of the known quaternary phosphonium salt charge agents lack thermal stability and, thus, totally or partially decompose during attempts to mix them with known toner binder materials in well-known processes of preparing toners by mixing addenda with molten toner binders. Such processes are often referred to as melt-blending or melt-compounding processes and are commonly carried out at elevated temperatures. Thus, charge agents that are thermally unstable at temperatures encountered during melt-compounding can exhibit this decomposition problem.

Also, some of the known quaternary phosphonium salt charge-control agents have relatively high melting points. During melt-blending, a molten charge agent can be more quickly, efficiently, and uniformly dispersed in the molten toner binder than can a solid charge agent. Non-uniform dispersion can result in poor or inconsistent charge-control performance from toner particle to toner particle (among other undesirable effects discussed below). Therefore, it is a drawback to have a charge agent that will not become molten at the temperatures that will be encountered in melt-compounding, because such a charge agent will be slowly, inefficiently, and non-uniformly dispersed in the toner binding during some melt-blending processes.

Furthermore, some of the known quaternary phosphonium salt charge agents have relatively high electrical conductivity, which can lead to poor performance of some developers.

Also, some known quaternary phosphonium salt charge agents exhibit high sensitivity to changes in environmental relative humidity and/or temperature, which can lead to erratic performance of the charge agents under changing environmental conditions.

Additionally, some of the known quaternary phosphonium salt charge agents will adversely interact chemically and/or physically with other developer or copier components. For example, some will interact with carrier or carrier coating materials (e.g., fluorohydrocarbon polymer coatings such as poly(vinylidene fluoride)) and lead to premature carrier aging and shortened useful developer life. Some will interact with certain toner colorants to cause unacceptable hue shifts in the toner. Some will interact with copier fuser rollers (e.g., rollers coated with fluorohydrocarbon polymers such as poly(vinylidene fluoride-co-hexafluoropropylene)) to cause premature failure of the copier's toner fusing system. Some will interact with surface layers of elecltrostatographic elements to cause poor latent image formation and shortened useful element life.

Also, poor dispersibility of some of the known quaternary ammonium salt charge agents in some of the known polyester toner binder materials, either because the charge agent remains solid during melt-compounding (as discussed above) or undergoes phse separation from the toner binder when it is attempted to increase its concentration therein, or because it is incompatible with or otherwise poorly dispersible in the binder, can lead to worsening of some of the problems mentioned above. Non-uniform dispersion of charge agent means that higher concentrations or agglomerations of charge agent will exist in some portions of the toner binder mix, compared to others. In typical melt-blending processes, the toner mixture is cooled and ground down to desired particle size after melt-blending. Agglomerations of charge agent provide sites in the mixture where fracture is more like to occur during grinding. The new surfaces created by such fracture will have a higher concentration of charge agent than will internal sites. Thus, the final toner particles will have a higher surface concentration of charge agent than internal concentration. It should be readily appreciated that if a charge agent tends to adversely interact with the environment, copier components, or other developer components, higher surface concentrations of charge agent on the toner particles will lead to a greater degree of such interaction, thus exacerbating problems such as high conductivity, high environmental sensitivity, and premature failure of carrier and copier component materials.

Furthermore, in the known dry developers containing known quaternary phosphonium salt charge-control agents in toner particles, the charge-control agents are not chemically bonded to the other toner components, e.g., the polymeric binders. Therefore, the charge-control agents can migrate within, and exude from, the toner particles over time, causing non-uniform dispersion, inconsistent and changing toner charge, and worsening of adverse interactions noted above.

Additionally, with some of the known quaternary phosphonium salt charge-control agents, the changes in charge level produced by relatively slight changes in charge-control agent concentration can be rather large, such that great precision is required in incorporating the exact amount of charge agent needed to produce a desired level of charge. A very slight deviation from the concentration required in a given toner, may result in a charge level outside of the range considered acceptable for that toner.

It would, therefore, be desirable to provide new polyester toner particles containing quaternary phosphonium salt compositions that perform the charge-controlling function well therein, while avoiding or minimizing all of the drawbacks noted above. The present invention does this.

SUMMARY OF THE INVENTION

The invention provides an electrostatographic toner particle having an average diameter in the range of 0.01 to 100 micrometers and comprising a binder polyester and a charge-control agent comprising a quaternary phosphonium salt, wherein the phosphonium salt has an anionic portion comprising a sulfonate group covalently bonded to a moiety containing at least one ester linkage to the binder polyester.

The phosphonium polyesters serve as dual function binder/charge-control agents in the inventive electrostatographic toner particles and have a number of advantages over the combinations of polyester binders and quaternary phosphonium salt charge-control agents described in the prior art.

The polyesters in the inventive toner particles have good thermal stability. Neither the polyesters as a whole, nor their quaternary phosphonium salt portions will thermally decompose during processes of melt-blending them with other addenda which it may be desirable to include in toner particles (e.g., other binders, colorants, release agents, etc.). They do not exhibit unacceptably high conductivity or environmental sensitivity.

In the inventive toner particles, the polyesters have not been found to interact unacceptably with commonly utilized toner colorants, carrier materials, or copier components such as fuser rolls and electrophotographic elements.

When such a polyester is used as the sole binder/charge-control agent in a toner particle of the invention, there is, of course, no problem of lack of compatibility with other binders. When it is desired to additionally include another binder polyester in the inventive toner particle, both polyesters can easily be fashioned to provide good compatibility with each other (most easily by choosing some of the recurring units of both polyesters to be the same or similar or by choosing recurring units that are already known to provide good compatibility when included in polyesters intended to be blended together). Since the quaternary phosphonium salt charge-control moiety is covalently bonded to the polyester, there is no problem of dispersibility, and no such problems have been found to arise when the polyester is mixed with another compatible polyester binder, in preparing toner particles of the invention.

Also because the salt moiety is covalently bonded to the polyester, there is no migration within, or exuding of the charge-control moiety from, the inventive toner composition.

Furthermore, it has been unexpectedly found that the covalent bonding of the anionic portion of the phosphonium salt to the polyester in a toner particle of the invention provides not only a good charge-control material, but one that is less sensitive to slight changes in its concentration in the toner than the corresponding non-bonded mixtures of polyesters and non-polymer quaternary phosphonium salt charge-control agents in toner particles of the prior art or than corresponding polyesters wherein the cationic portion of the phosphonium salt is covalently bonded to the polyester. I.e., in toner particles of the present invention relatively slight changes in phosphonium salt concentration produce changes in charge level that are not as large. Therefore, less precision is required in incorporating an amount of charge agent adequate to produce a charge level within an acceptable range.

Also, if desired, greater concentrations of the polyester-bound phosphonium salt charge-control moiety can be included in toner particles of the invention than with the prior art non-polymeric salts, since there is no problem of phase separation of higher concentrations.

An additional advantageous feature of some embodiments of the new toner particles is that the polyesters included therein can be prepared by known melt-polycondensation techniques, rather than having to use more complex solution-polycondensation techniques wherein additional steps must be taken to isolate the polyester from solvents. This is because the monomers (including the phosphonium salt-containing monomers) needed to produce the polyesters are capable of experiencing the relatively harsh thermal environment (e.g., 220°–240° C.) of melt-phase synthesis for necessarily prolonged periods (e.g., up to 5 or 6 hours) without undergoing thermal degradation.

The invention also provides a new dry electrostatographic developer comprising the inventive toner particles mixed with carrier particles.

It should be noted that other inventive toners and developers containing other phosphonium polyesters or other phosphonium polymers, are described and claimed in copending U.S. Pat. Applications 229,043; 229,046; and 229,047, all filed Aug. 5, 1988.

DESCRIPTION OF PREFERRED EMBODIMENTS

A polyester useful in a toner particle of this invention comprises any of the recurring units known to be useful in polyester toner binders in general, with the additional proviso that the polyester contains a quaternary phosphonium salt comprising a cationic portion and an anionic portion, wherein the anionic portion of the salt comprises a sulfonate group covalently bonded to a moiety containing at least one ester linkage to the rest of the polyester.

While the anionic sulfonate group is monovalently bonded to the rest of the polyester through one ester linkage in some toner embodiments (as an endcapping unit or pendant unit), in other embodiments it is divalently incorporated into the backbone of the polyester as a recurring backbone unit (through two ester linkages which are contained in a moiety to which the anionic sulfonate group is covalently bonded).

In all of the toner embodiments mentioned above the polyester has the advantages previously described, apparently because of the covalent bonding of the anionic portion of the phosphonium salt to the rest of the polyester.

In some preerred embodiments of the inventive toner particle, wherein the phosphonium polyesters and the monomers useful to prepare them have the thermal stability to withstand the harsh thermal conditions of melt-polycondensation, the toner particle comprises a phosphonium polyester, wherein the phosphonium salt has the structure

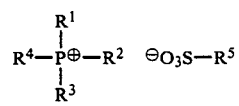

wherein:

$R^1$, $R^2$, $R^3$, and $R^4$ are each independently: alkyl which is unsubstituted or substituted with one or more aryl; or aryl which is unsubstituted or substituted with one or more alkyl;

$R^5$ is aryl substituted with one or more moiety containing an ester linkage to the binder polyester;

each alkyl moiety recited above has from 1 to 20 carbon atoms; and each aryl moiety recited above has from 6 to 14 carbon atoms.

Such phosphonium polyesters can be prepared by any of the known polycondensation techniques for producing polyesters, e.g., solution polycondensation or melt-phase polycondensation. Melt-polycondensation is the preferred technique, because it requires no isolation of product from solvents.

Monomers useful to prepare polyesters for the toner particles of the invention contain groups functional to produce ester linkages, e.g., carboxylic acid, ester, anhydride, hydroxy, epoxide, etc. Monomers useful to prepare backbone recurring units contain two or more such groups, while monomers intended to form endcaps or pendant units can contain just one. The quaternary phosphonium salts are most conveniently incorporated in the form of monomers of these types during the polycondensation, but they can also be appended to functionalized sites after polymerization if desired.

Other than the phosphonium salt-containing monomers needed, other monomers useful in preparing phosphonium polyesters for the inventive toner particles are any of those known to be useful in general to prepare polyester binders for toner particles. Some specific examples of such monomers are: 1,4-cyclohexanediol; 1,4-cyclohexanedimethanol; 1,4-cyclohexanediethanol; 1,4-bis(2-hydroxyethyoxy)cyclohexane; 1,4-benzenedimethanol; 1,4-benzenediethanol; norbornylene glycol; decahydro-2,6-naphthalenedimethanol; glycerol; bisphenol A; ethylene glycol; diethylene glycol; triethylene glycol; 1,2-propanediol; 1,3-propanediol; 1,4-butanediol; 2,3-butanediol; 1,5-pentanediol; neopentyl glycol; 1,6-hexanediol; 1,7-heptanediol; 1,8-octanediol; 1,9-nonanediol; 1,10-decanediol; 1,12-dodecanediol; pentaerythritol; 2,2,4-trimethyl-1,6-hexanediol; 4-oxa-2,6-heptanediol; 2,2-dimethyl-1,3,-dihydroxypropane; succinic acid; sebacic acid; 2-methyladipic acid; diglycolic acid; thiodiglycolic acid; fumaric acid; cyclohexane-1,3-dicarboxylic acid; cyclohexane-1,4-dicarboxylic acid; 2,5-norbornanedicarboxylic acid; phthalic acid; isophthalic acid; terephthalic acid; 2-butylisophthalic acid; 2,6-napthalenedicarboyxlic acid; 1,4-naphthalenedicaboxylic acid; 1,5-naphthalenedicarboxylic acid; 4,4'-sulfonyldibenzoic acid; 4,4'-oxydibenzoic acid; binaphthyldicarboxylic acid; 9,10-triptycenedicarboxylic acid; and the anhydrides and lower alkyl esters of the acids mentioned.

Some specific examples of phosphonium salt-containing monomers useful in preparing the phosphonium polyesters useful in the inventive toner particles are: methyltriphenylphosphonium 3,5-bis(carbomethoxy)benzenesulfonate; methyltriphenylphosphonium 3,5-bis(carboxy)benzenesulfonate; methyltriphenylphosphonium (p-benzoic acid)sulfonate; methyltriphenylphosphonium (m-benzoic acid)sulfonate; methyltriphenylphosphonium (p-phenol)sulfonate; and methyltriphenylphosphonium 3,4-bis(carboxy)benzenesulfonate Useful functionalized quaternary phosphonium salt-containing monomers (i.e., those containing the groups necessary to form ester linkages) are prepared by well-known methods, e.g., reacting appropriate tertiary phosphines with appropriate alkylating agents (e.g., the functionalized arylsulfonates). If the alkylating agents employed are halides, the phosphonium halide is readily converted into the phosphonium arylsulfonate by ion exchange with the sodium or silver salt of the appropriate functionalized arylsulfonic acid. Any desired tertiary phosphines or functionalized sulfonates not readily availble can be prepared by known methods described in the general literature. See, e.g., U.S. Pat. Nos. 4,035,346 and 3,732,183 for further details of preparation of monomers and polyesters.

Preferred polyesters for use as dual function binder/charge-control agents in preferred electrostatographic toner particles of the invention are amorphous polyesters having a glass transition temperature (referred to as Tg) in the range of about 40° to about 150° C., and more preferably about 50° to about 120° C. Such polyesters can be heat-fixed to smooth-surfaced film substrates as well as to more conventional substrates, such as paper, without difficulty. Tg can be determined by any conventional method, e.g., differential scanning calorimetry.

Preferred embodiments contain polyesters having inherent viscosity in the range of about 0.01 to about 0.65 deciliters per gram (dl/g), as measured at 25° C. and at a concentration of 2.5 g/l in a solution of dichloromethane (DCM), dimethylformamide (DMF), or a 1:1 by weight mix of phenol:chlorobenzene (P:CB).

To perform the charge-control function in an inventive electrostatographic toner particle, the phosphonium polyester will usually be included in the toner particle in an amount sufficient to yield a concentration of individual phosphonium salt portions of the polyester in the range of about $10^{-9}$ to about $10^{-4}$ moles of phosphonium salt moieties per gram of all material in the toner particle. The exact concentration employed will depend on the level of charge desired and the triboelectric nature of the polyester and all other materials in the inventive toner particle (and also the triboelectric nature of the carrier particles, if the toner particles are intended to be mixed with carrier particles to form an inventive so-called "two-component" electrostatographic developer). The polyesters can also be used as binder/charge-control agents in toner particles intended to be used by themselves (i.e., with no carrier particles) as a so-called "single component" electrostatographic developer.

It should be appreciated that the desired concentration of phosphonium salt moieties in the inventive toner particle can be effected in more than one manner. In cases where the toner particle consists of only the phosphonium polyester, the moles of phosphonium salt moieties per gram of toner particle will be equal to the moles of phosphonium salt-containing units per gram of polyester. In cases where other materials (e.g., other binders, colorants, release agents, etc.) are additionally included in the inventive toner particle, the moles of phosphonium salt-containing units per gram of polyester must be higher than the moles of phosphonium salt moieties per gram of toner particle to compensate for the additional weight of other materials in the particle. Thus, phosphonium polyesters useful in the inventive toner particles, include not only those in which phosphonium salt-containing units are included in a concentration range of $10^{-9}$ to $10^{-4}$ moles per gram of polyester, but also others in which the concentration of phosphonium salt-containing units is considerably higher than that range.

As noted above, the inventive toner particles can additionally contain other materials, such as other binders, colorants, release agents, etc.

Other binders which can be mixed with the anion-bound phosphonium polyesters in inventive toner particles include any of the polymers known to be useful as toner binders.

Among the various other polymeric binders which can be mixed with the phosphonium polyesters in toner particles of the invention are other polyesters (including polycarbonates), polyamides, phenol-formaldehyde polymers, polyesteramides, alkyd resins, and vinyl-addition polymers and copolymers, typically formed from monomers such as styrenes, butadiene, acrylates and methacrylates, among others. For further descriptions of some of these other polymeric binders, see, for example, U.S. Pat. Nos. 3,809,554; Re 31,072; 3,694,359; 2,917,460; 2,788,288; 2,638,416; 2,168,552; 4,416,965; 4,691,966; and 2,659,670.

Numerous coolant materials selected from dyestuffs or pigments can be employed in toner particles of the invention. Such materials serve to color the toner and/or render it more visible. Of course, suitable toner materials having the appropriate charging characteristics can be prepared without the use of a colorant material where it is desired to have a developed image of low optical density. In those instances where it is desired to utilize a colorant, the colorants can, in principle, be selected from virtually any of the compounds mentioned in the Colour Index Volumes 1 and 2, Second Edition.

Included among the vast number of useful colorants are such materials as Hansa Yellow G (C.I. 11680), Nigrosine Spirit soluble (C.I. 50415), Chromogen Black ETOO (C.I. 45170), Solvent Black 3 (C.I. 26150), Fuchsine N (C.I. 42510), C.I. Basic Blue 9 (C.I. 52015). Carbon Black also provides a useful colorant. The amount of colorant added may vary over a wide range, for example, from about 1 to about 20 percent of the weight of the polymer. Particularly good results are obtained when the amount is from about 1 to about 10 percent.

To be utilized as a binder/charge-control agent in the inventive electrostatographic toners, the phosphonium polyester is mixed in any convenient manner (preferably by melt-blending as described, for example, in U.S. Pat. Nos. 4,684,596 and 4,394,430) with any other desired addenda, and the mix is then ground to desired size to form a free-flowing powder of inventive toner particles containing the polyester.

Toner particles of the invention have an average diameter between about 0.01 μm and about 100 μm, a value in the range from about 1.0 to about 30 μm being preferable for many currently used machines. However, larger or small particles may be needed for particular methods of development or development conditions.

To be utilized as toners in electrostatographic developers of the invention, toner particles of this invention can be mixed with a carrier vehicle. The carrier vehicles which can be used to form such inventive developer compositions can be selected from various materials. Such materials include carrier core particles and core particles overcoated with a thin layer of film-forming resin.

The carrier core materials can comprise conductive, non-conductive, magnetic, or non-magnetic materials. For example, carrier cores can comprise glass beads; crystals of inorganic salts such as aluminum potassium chloride; other salts such as ammonium chloride or sodium nitrate; granular zircon; granular silicon; silicon dioxide; hard resin particles such as poly(methyl methacrylate); metallic materials such as iron, steel, nickel, carborundum, cobalt, oxidized iron, or mixtures or alloys of any of the foregoing. See, for example, U.S. Pat. Nos. 3,850,663 and 3,970,571. Especially useful in magnetic brush development schemes are iron particles such as porous iron particles having oxidized surfaces, steel particles, and other "hard" or "soft" ferromagnetic materials such as gamma ferric oxides or ferrites, such as ferrites of barium, strontium lead, magnesium, or aluminum. See, for example, U.S. Pat. Nos. 4,042,518; 4,478,925; and 4,546,060.

As noted above, the carrier particles can be overcoated with a thin layer of a film-forming resin for the purpose of establishing the correct tribo-electric electric relationship and charge level with the toner employed. Examples of suitable resins are the polymers described in U.S. Pat. Nos. 3,547,822; 3,632,512; 3,795,618 and 3,898,170 and Belgian Pat. No. 797,132. Other useful resins are fluorocarbons such as polytetrafluoroethylene, poly(vinylidene fluoride), mixtures of these, and copolymers of vinylidene fluoride and tetrafluoroethylene. See, for example, U.S. Pat. Nos. 4,545,060; 4,478,925; 4,076,857; and 3,970,571. Such polymeric fluorohydrocarbon carrier coatings can serve a number of known purposes. One such purpose can be to aid the inventive developer to meet the electrostatic force requirements mentioned above by shifting the carrier particles to a position in the triboelectric series different from that of the uncoated carrier core material, in order to adjust the degree of triboelectric charging of both the carrier and toner particles. Another purpose can be to reduce the frictional characteristics of the carrier particles in order to improve developer flow properties. Still another purpose can be to reduce the surface hardness of the carrier particles so that they are less likely to break apart during use and less likely to abrade surfaces (e.g., photoconductive element surfaces) that they contact during use. Yet another purpose can be to reduce the tendency of toner material or other developer additives to become undesirably permanently adhered to carrier surfaces during developer use (often referred to as scumming). A further purpose can be to alter the electrical resistance of the carrier particles.

A typical developer composition of the invention containing inventive toner particles and a carrier vehicle generally comprises from about 1 to about 20 percent by weight of the toner particles and from about 80 to about 99 percent by weight carrier particles. Usually, the carrier particles are larger than the toner particles. Conventional carrier particles have a particle size on the order of from about 2 to about 1200 microns, preferably 5-300 microns.

Alternatively, toners of the present invention can be used in a single component developer, i.e., with no carrier particles.

Toner and developer compositions of this invention can be used in a variety of ways to develop electrostatic charge patterns or latent images. Such developable charge patterns can be prepared by a number of means and be carried for example, on a light sensitive photoconductive element or a non-light-sensitive dielectric-surfaced element such as an insulator-coated conductive sheet. One suitable development technique involves cascading the developer composition across the electrostatic charge pattern, while another technique involves applying toner particles from a magnetic brush. This latter technique involves the use of a magnetically attractable carrier vehicle in forming the developer composition. After imagewise deposition of the toner particles, the image can be fixed, e.g., by heating the toner to cause it to fuse to the substrate carrying the toner. If desired, the unfused image can be transferred to a receiver such as a blank sheet of copy paper and then fused to form a permanent image.

The following examples are presented to further illustrate some preferred embodiments of the toners and developers of the invention and the polyesters employed therein and to compare their properties and performance to those of toners and developers outside the scope of the invention.

In the examples below polyester names contain an indication of the molar ratios of the various units in the polyester. In some examples (as indicated therein) the relative concentrations of units are expressed as molar ratios of the monomers used to prepare the polyester.

Where toner charge in a developer is indicated, usually as microcoulombs per gram of toner particles ($\mu c/g$), the charge was determined by a technique referred to as the "MECCA" method, wherein the apparatus consists of two parallel metal plates separated by insulating posts about 1 cm high. An AC electromagnet is located beneath the lower plate to provide magnetic agitation, while a DC electric potential of about 2000 volts can be applied across the plates. A sample of about 0.1 gram of developer is weighed, placed on the lower plate, and charged by magnetic agitation for 30 seconds. Next, both the electric and magnetic fields are applied for 30 seconds. The toner is separated from the carrier by the combined agitation and electric field and is transported to the upper plate by the electric field. The charge on the toner collected by the top plate is measured in microcoulombs by an electrometer, and the weight of toner is determined. The registered charge was divided by the weight of the plated toner to obtain the charge per mass of toner.

EXAMPLE 1

This examples illustrates the good charging properties of an inventive dry electrostatographic toner and developer. A polyester having an inherent viscosity of 0.47 dl/g in dichloromethane and a Tg of 62° C., and prepared by melt-polycondensation of the monomers dimethyl terephthalate, dimethyl glutarate, methyltriphenylphosphonium 3,5-bis(carbomethoxy)benzenesulfonate, 1,2-propanediol, and glycerol in molar ratios 84.75/15/0.25/92.5/5, respectively, was employed as a dual function binder/charge-control agent.

Inventive toner particles were prepared by melt-compounding 40 parts by weight of the polyester with 2 parts by weight of Regal 300 TM pigment (a trademarked carbon black pigment sold by Cabot Corporation, USA). This was accomplished by heating and mixing the pigment and polyester on a two-roll rubber mill, cooling the mass to room temperature, and coarse grinding and fluid energy-milling to produce toner particles having diameters in the range of 2 to 40 micrometers. The phosphonium salt charge-control moiety concentration in moles per gram of total toner material was calculated to be $1.18 \times 10^{-5}$ moles/g.

The toner particles were then mixed with carrier particles in a closed container on a two-roll mill for 30 seconds to form an inventive triboelectrically charged two-component dry electrostatographic developer comprising about 13 weight percent toner particles. The carrier particles employed were strontium ferrite particles coated with one part per hundred by weight of a thin poly(vinylidene fluoride) film.

The triboelectric charge per mass of toner particles was then measured. It was 7.7 microcoulombs per gram.

EXAMPLE 2

Charging capability compared to toner outside the scope of the invention

In this example the charge-control capability of a phosphonium polyester in a toner of the invention is shown and compared to the capability of a charge-control agent in a control toner outside the scope of this invention.

In the example and the control the charge-control agent was melt-compounded into toner particles and mixed with coated carrier particles as in Example 1. In the example and control the toner particles contained no added pigment or colorant, but the charge-control agent, whether polymeric or not, was mixed with an additional polyester, namely, poly(neopentylene-co-pentaerythrityl 95/2.5 terephthalate-co-glutarate 95/5), in proportions sufficient to yield a concentration of $2.1 \times 10^{-5}$ moles of phosphonium salt charge-control moieties per gram of total material in the toner particles.

After mixing with coated carrier particles, each toner's triboelectric charge was measured in microcoulombs per gram of toner ($\mu c/g$).

In the control the only charge-control agent was methyltriphenylphosphonium p-toluenesulfonate, a non-polymeric charge-control agent employed in toners of the prior art.

In the example the only charge-control agent was a polyester formed by polycondensation of the monomers, dimethyl terephthalate, dimethyl glutarate, methyltriphenylphosphonium 3,5-dicarbomethoxybenzenesulfonate, neopentyl glycol, and pentaerythritol in molar ratios 94/5/1/95/2.5, respectively. This is a phosphonium salt polyester, wherein the anionic portion of the salt is covalently bonded into the polyester by two ester linkages. The polyester had an inherent viscosity of 0.57 dl/g in DCM and a Tg of 67° C.

Results are presented in Table I.

TABLE I

| Example | Nature of the Charge-Control Agent | Toner Charge ($\mu c/g$) |
|---------|-----------------------------------|-------------------------|
| Control | non-polymeric phosphonium salt | 40.4 |
| 2 | polyester with anionic portion of the phosphonium salt covalently bonded (2 bonds) | 33.2 |

The invention has been described in detail with particular reference to certain preferred embodiments thereof, but it should be appreciated that variations and modifications can be effected within the spirit and scope of the invention.

What is claimed is:

1. In an electrostatographic toner particle having an average diameter in the range of 0.01 to 100 micrometers and comprising a binder polyester and a charge-control agent comprising a quaternary phosphonium salt, the improvement wherein the phosphonium salt has an anionic portion comprising a sulfonate group covalently bonded to a moiety containing at least one ester linkage to the binder polyester.

2. The toner particle of claim 1, wherein the phosphonium salt has the structure

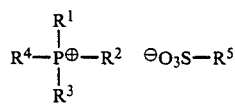

wherein:
- $R^1$, $R^2$, $R^3$, and $R^4$ are each independently: alkyl which is unsubstituted or substituted with one or more aryl; or aryl which is unsubstituted or substituted with one or more alkyl;
- $R^5$ is aryl substituted with one or more moiety containing an ester linkage to the binder polyester;
- each alkyl moiety recited above has from 1 to 20 carbon atoms; and
- each aryl moiety recited above has from 6 to 14 carbon atoms.

3. The toner particle of claim 2, wherein the anionic portion of the phosphonium salt is divalently bonded into the polyester through two ester linkages contained in $R^5$.

4. The toner particle of claim 1, further comprising a second binder polyester.

5. The toner particle of claim 1, further comprising a colorant.

6. In a dry electrostatographic developer comprising:
(a) carrier particles and
(b) toner particles,
the improvement wherein the toner particles are as defined in claim 1.

* * * * *